May 30, 1933. H. KLATT 1,911,695
HELICOPTER TYPE AIRCRAFT
Filed May 4, 1932 7 Sheets-Sheet 1

WITNESS

INVENTOR
Herman Klatt
BY
ATTORNEY

May 30, 1933.  H. KLATT  1,911,695
HELICOPTER TYPE AIRCRAFT
Filed May 4, 1932  7 Sheets-Sheet 4

Patented May 30, 1933

1,911,695

UNITED STATES PATENT OFFICE

HERMAN KLATT, OF PUEBLO, COLORADO

HELICOPTER-TYPE AIRCRAFT

Application filed May 4, 1932. Serial No. 609,313.

This invention relates to improvements in aircraft especially of the helicopter type, and its objects are as follows:—

First, to provide a heavier-than-air craft of the helicopter type wherein a vertical lift is obtained by means of certain lifter wing sets which are operated with a peculiar end-over-end action to displace the air much on the order of the performance of a swimmer's hands in the act of swimming, said wing sets being substituted for the usual propeller or propellers turning on vertical axes and characterizing the known helicopter.

Second, to provide a heavier-than-air craft in which the acts of vertical and horizontal propulsion and propulsion in intermediate directions as well as the sustentation of the craft in midair and its gradual lowering are each and all performed by the foregoing wing sets which, for the various purposes enumerated, are classed as puller wing sets, lifter wing sets and pusher wing sets.

Third, to provide an aircraft in which the puller and pusher wing sets are combined with leading and trailing edges which have means by which they can be adjusted to any desired radial position for purposes later explained in detail.

Fourth, to provide a heavier-than-air craft in which all revolving bladed propellers such as commonly known are eliminated, the foregoing acts of propulsion, etc., being confined strictly to the wing sets which perform strokes of the peculiar character already announced.

Fifth, to stagger the lifter wing sets so that some of the sets will always be in the act of performing lifting strokes, thus avoiding any tendency toward an interrupted lifting impulse.

Sixth, to provide a wing set for an aircraft which comprises a pair of blades which are made to perform substantial rectilinear motions while traveling together in one general direction and then outward arcuate motions to a return position from which the rectilinear motions are repeated, this action of the blades tending to create a vacuum between them at the time of departure from each other on said arcuate motions, said blades bearing down on the air during said arcuate motions and thereby causing the propulsion of the aircraft much in the manner that a swimmer causes propulsion of his body through the water by a similar performance with his hands.

Other objects and advantages will appear in the following specification, reference being had to the accompanying drawings in which.

It has long since been the aim of persons concerned with the development of aircraft to evolve an aircraft of the heavier-than-air type which could be made to rise from the ground in a substantially vertical direction and land in the same manner. Within comparatively recent times such a type of craft known as the autogyro has been successfully used. This aircraft employs a very large propeller which works on a vertical axis and also employs the conventional propeller which operates on a horizontal axis.

It is unnecessary to enlarge upon the dangers of the horizontal propeller, there being instances on record of the almost instantaneous death of persons who have come into contact with it because of its necessarily exposed and outstanding position. The vertical propeller also has its shortcomings one of which is its inordinately large size, one objection to which, if none other, is the difficulty of storing the craft.

The instant invention seeks to preserve all of the good features of the known helicopter and at the same time provide an aircraft of the utmost compactness by virtue of the elimination of the conventional horizontal propeller as well as of the vertical propeller.

The general construction of the aircraft, largely the framework, etc. is as follows: The fuselage 1 (Figs. 1 and 3) is of any known type, and any departure from the conventional shapes will be regulated by the mechanism which it contains. It may be equipped either with a ground landing gear 2 (Fig. 5) or with pontoons to enable landing on water. These and other mechanical details have no concern with the invention.

Figure 5:
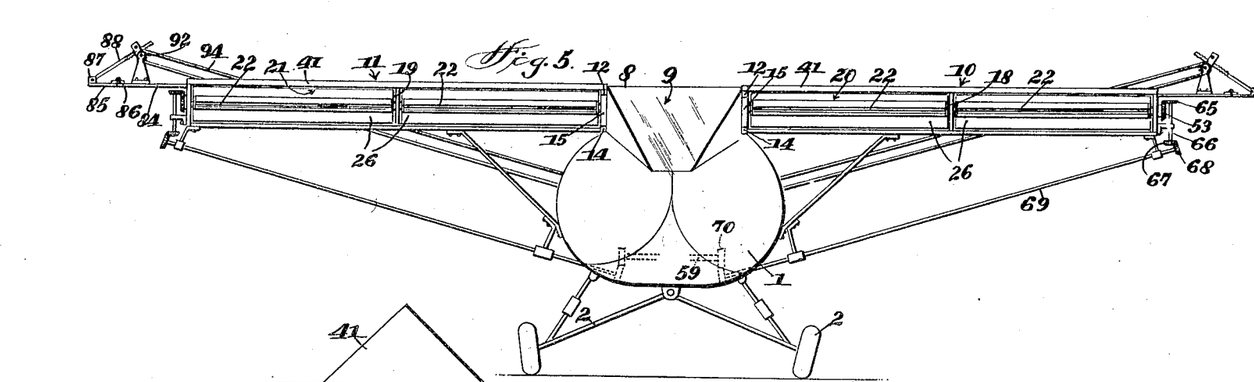
Figure 5 is a front elevation of the aircraft.

A pair of engines 3, 4 (Fig. 3) is appropriately mounted in the fuselage 1 below a floor 5 to which the aviator's seat 6 is attached. The compartment 7 above the floor 5 is in the nature of a cockpit which is roofed over by a cover 8. This cover includes a visor shaped window 9 at the front (Fig. 5). This window will be in the line of vision of the aviator, and the shafting, gearing and other mechanism seen in Figure 3 will be so disposed and enclosed as not to interfere with the aviator's control of the craft.

Figures 1, 2:
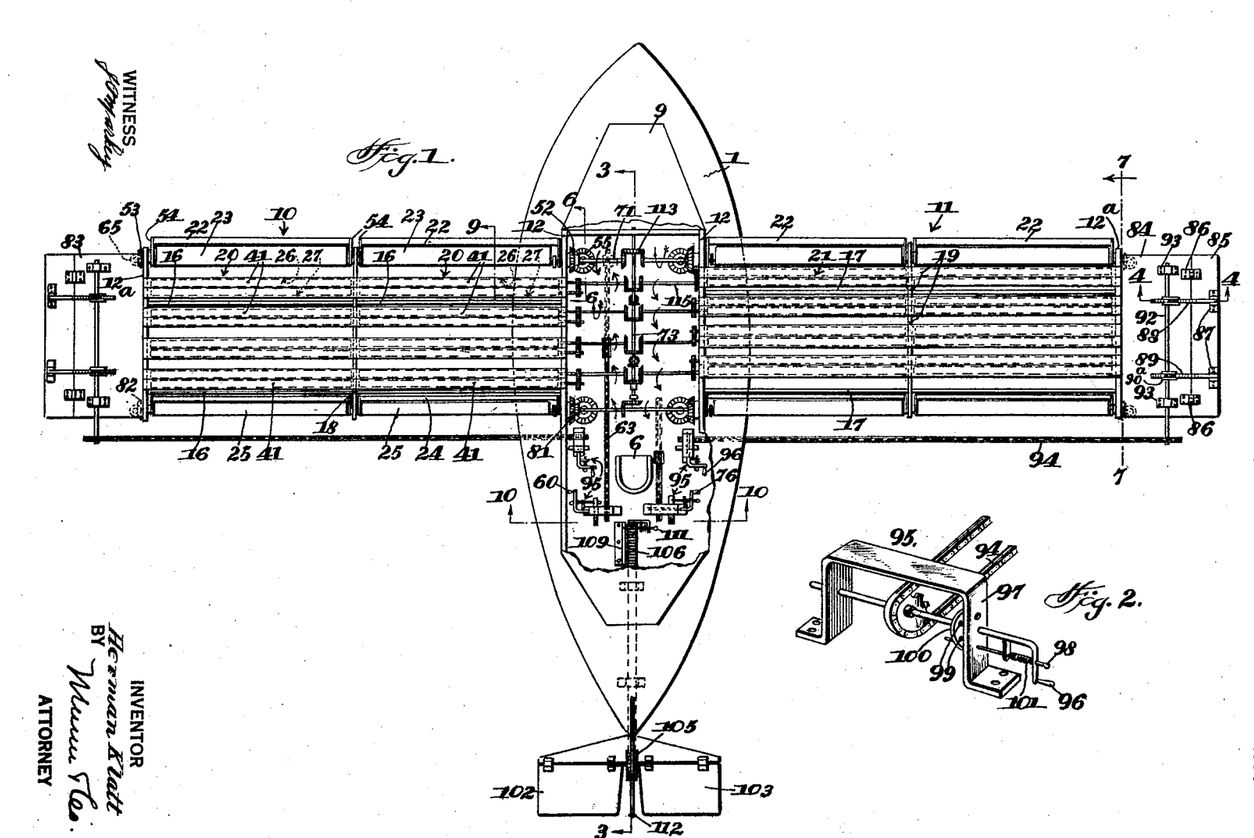
Figure 1 is a plan view of the improved helicopter-type aircraft, a portion of the fuselage being broken away to reveal the internal workings.
Figure 2 is a detail perspective view of a type of device for adjusting either the ailerons or the casings for the puller and pusher wing sets.
Figures 3, 4:
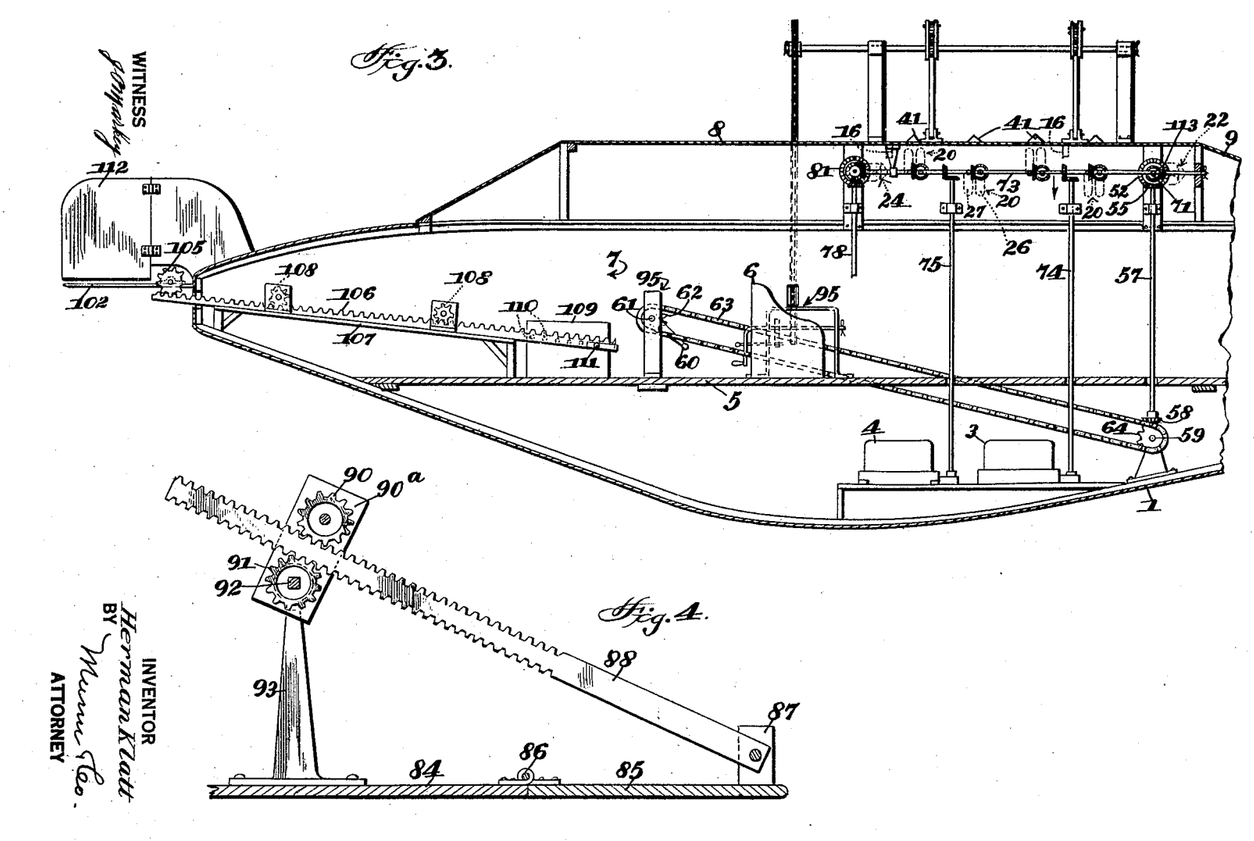
Figure 3 is a longitudinal section taken on the line 3—3 of Figure 1.
Figure 4 is a section taken on the line 4—4 of Figure 1, particularly illustrating one of the aileron setting racks.
Figure 6:
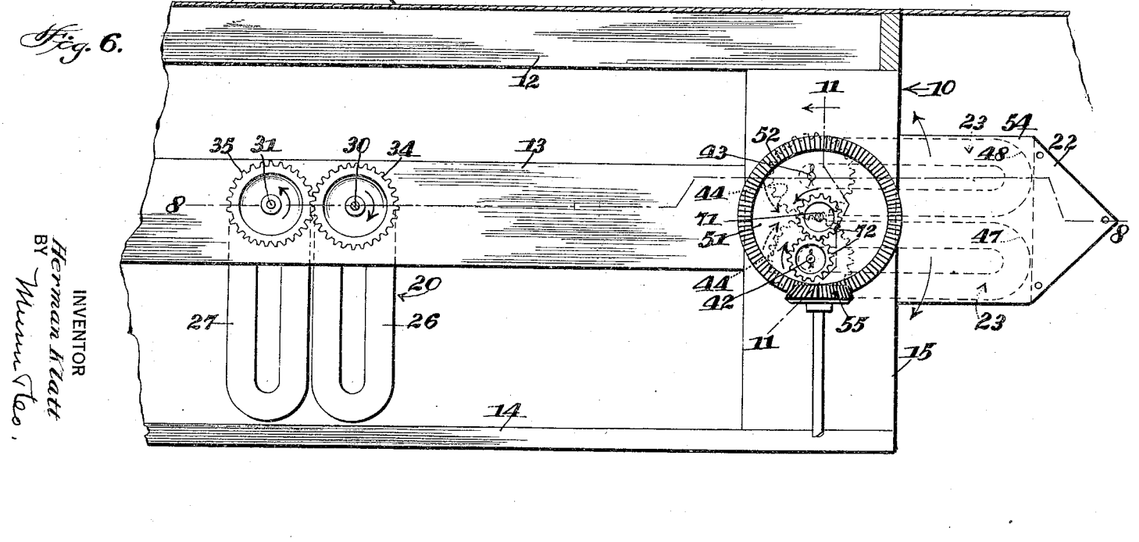
Figure 6 is a detail section taken on the line 6—6 of Figure 1, particularly showing one of the leading edges and part of the drive mechanism of the puller wing set and also showing one of the lifter wing sets.

Although the cover 8 appears to be of light construction in Figure 3 it is actually a part of a relatively heavy framework which constitutes the foundation of the wing members 10, 11 (Fig. 1). This framework includes confronting parallel sets of girders 12, 13 and 14 partially shown in Figure 6. This girder set occurs at the immediate left of the cockpit, and the drawings must be read as including a duplicate set at the right of the cockpit. Corresponding girders, preferably of a lighter construction, occur near the extremities of the wing members 10, 11, these being denoted 12ª, 13ª and 14ª in Figures 7 and 9 which reveal the end girder sets.

Figure 7:
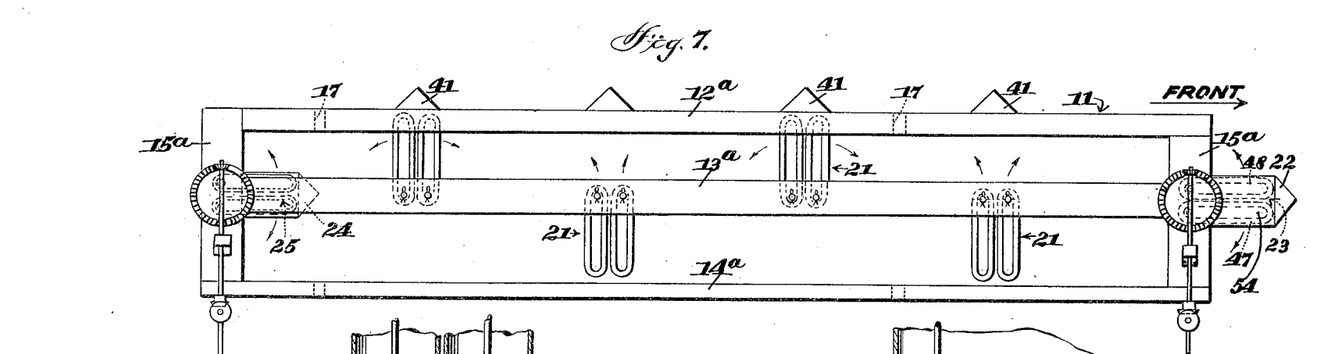
Figure 7 is a cross section taken on the line 7—7 of Figure 1, particularly illustrating the staggered arrangement of the lifter wing sets.

Upright connectors 15 (Fig. 6) and 15ª (Figs. 7 and 9) together with longitudinals 16 and 17 and medial cross braces 18, 19 (Fig. 1) complete a framework on which a plurality of lifter wing sets 20, 21 is mounted (Fig. 1) together with the leading edges 22 of puller wing sets (Fig. 6) and the trailing edges 24 of pusher wing sets 25 (Fig. 7).

These various wing sets are the substitutes of the propellers of the conventional helicopter, and the manner of their construction and operation is as follows:— One of the wing sets 20 is considered first, the other corresponding sets being identical in both wing members 10 and 11. The wing set 20 (Figs. 6 and 9) comprises a pair of hollow blades 26, 27. These blades extend, for example, from the medial cross brace 18 (left side of Figure 1) to the end girder set 12ª, etc. Other wing sets fit the spaces between the medial cross brace 18 and one of the confronting girder sets 12, etc. in the manner plainly seen in dotted lines in Figure 1.

A filler 28 is fitted in and appropriately secured to each blade 26, 27 (Figs. 8 and 9), this filler being duplicated at each end of the respective blade, and, if desired, a third filler may be located midway of the length of the blade so as to stabilize the driving action. In each instance this filler has an internal endless rack 29 (Figs. 8 and 9) with which a drive pinion is in constant engagement. The contour of the rack 29 substantially agrees with the outer contour of the respective hollow blade 26. Inasmuch as the rack 29 is formed internally of the filler 28 it follows that the center of the filler is open, and it is this opening which enables the blade to work around the relatively stationary actuating shaft.

Figure 8:
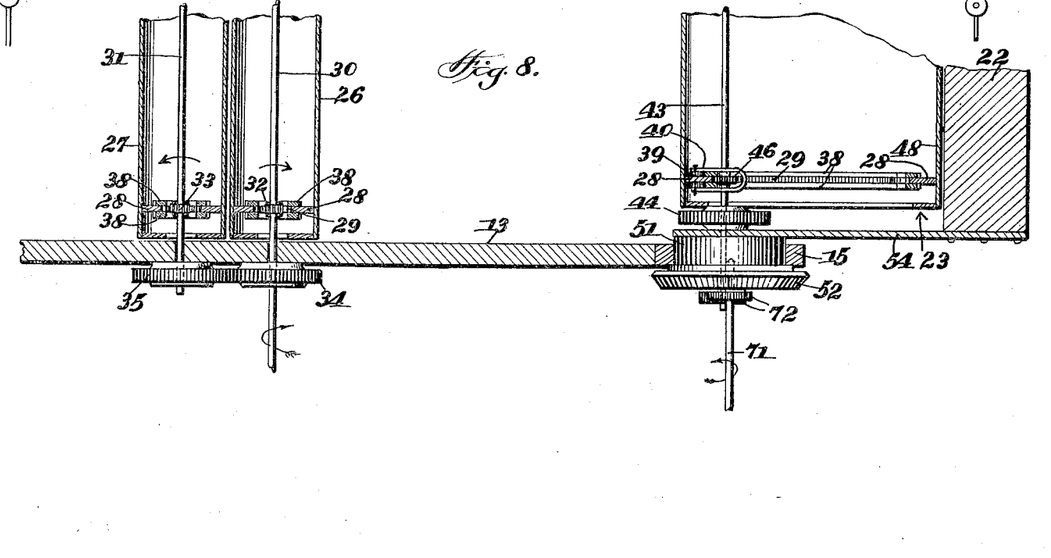
Figure 8 is a fractional horizontal section taken on the line 8—8 of Figure 6.

There are two of the actuating shafts for the wing set 20, one of these denoted 30 is the drive shaft (Fig. 8), the other denoted 31 the driven shaft. The respective shafts carry pinions 32, 33 as mentioned before, and insofar as the respective blades 26, 27 are concerned each of the pinions is a drive pinion. The shafts 30, 31 are connected by gears 34, 35 (Fig. 8).

Consider the shaft 30 as being driven clockwise. The shaft 31 will be driven counter-clockwise by virtue of the gear connection. The action of the pinions 32, 33 (Fig. 9) in mesh with the racks 29 will be to elevate the blades 26, 27 to the dotted line positions 26ª, 27ª. The blades remain substantially parallel while traversing their rectilinear paths in the perpendicular direction. This action simulates the forward part of a breast stroke in swimming.

The result is a parting of the air, and when the blades separate, as they presently do, a partial vacuum will be formed in the region 36 (Fig. 9), assisting in lifting the aircraft. In fact the formation of the partial vacuum is responsible for a large percentage of the lifting action. After the blades 26, 27 reach the dotted line position (Fig. 9) they are compelled to swing outwardly by the continuance of rotation of the pinions 32, 33 in the direction of the arrows 37, thus describing motions over arcuate paths of which the pinions 32, 33 comprise the substantial centers.

These arcuate motions of the blades 26, 27 simulate the back stroke of the swimmer, and the effect of the blades is to push downwardly on the air and thus assist in lifting the aircraft. After the blades have completed their arcuate motions they will resume the full line positions in Figure 9, and when these positions are reached the pinions 32, 33 will repeat their rectilinear displacement of the blades.

Figure 9:
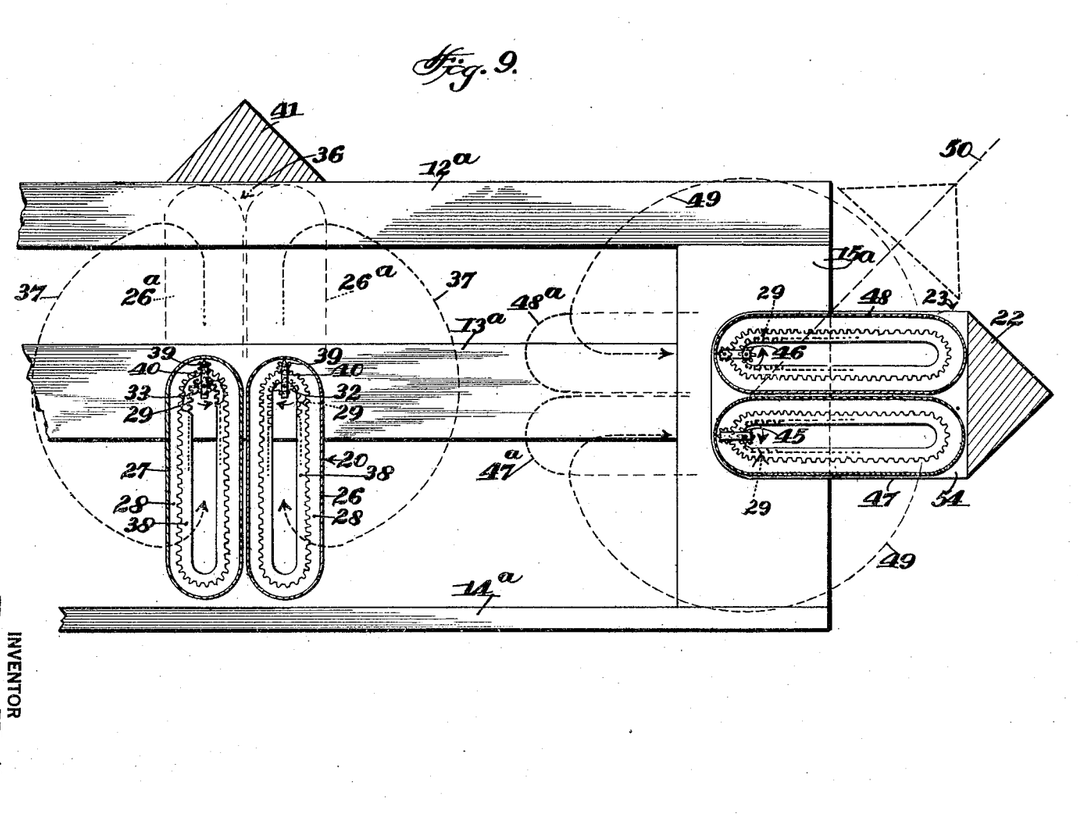
Figure 9 is a cross section taken on the line 9—9 of Figure 1, particularly showing some of the internal details of the puller and lifter wing sets of Figure 6.

It will be understood that the successive rectilinear and arcuate motions of the blades 26, 27 perform an end-over-end action along symmetrical paths which causes them to continuously assume recurrent positions and feathers the blades first into the air and then causes a stroke against the air for the purpose already brought out. This principle and mode of operation prevails in all of the wing sets whether of the lifter wing sets 20, 21, the puller sets 23 or pusher sets 24.

It is necessary to maintain contact of the pinions 32, 33 (Fig. 9) with the internal racks 29. In each instance the filler rack 28 is flanked by endless rack flanges 38 (Fig. 8). These members are nothing more than elongated open-centered members, conforming to the contour of the filler rack 28 and the blade itself, and provided with an outer rack surface with which idler pinions 39 mesh (Fig. 9). These pinions are coupled with the drive pinions by yokes 40 and the purpose of the latter is to hold the pinions together against the racks so that there will be no possibility of the internal rack 29 dropping out of engagement with its driver pinion.

The shafts 30, 31 (Fig. 8) are journaled on the mid girder 13 (Fig. 6) and its equivalents in the respective wing member 10. Immediately above the lifter wing set 20 (Fig. 9) there is a triangular entering edge 41. This edge is mounted on top of the wing framework. It may be made either solid as illustrated (Fig. 9) or hollow, but in any event its function is to part the air and thus assist the blades 26, 27 in producing a higher degree of vacuum in the region 36. It will be understood that while the blades are undergoing their initial opening movement they will be substantially covered by the entering edge 41 so that the region 36 will for an instant comprise a chamber of a substantial size.

Each of the lifter wing sets has a similar entering edge 41 thereabove as shown in Figure 7. These entering edges are relatively stationary, being suitably affixed to the wing framework as already suggested. The wing sets are staggered in reference to these entering edges (Fig. 7), so that a lifting action will always be in progress. In other words, while the first wing set 20 (right of Figure 7) is commencing an upward stroke, the second wing set is commencing a downward stroke, and by the time the second set completes its downward stroke the first set will be beginning its downward stroke.

The puller wing sets 23, associated with the leading edges 22, are identical with the lifter sets 20. There are drive and driven shafts 42, 43 (Figs. 6 and 11) which are geared together at 44 so as to cause the shafts and ultimately the drive pinions 45, 46 (Fig. 9) to rotate in opposite directions. Consider Figure 9. It will be understood that the rotation of the pinions 45, 46, in the directions shown, considering the puller blades 47, 48 in the full line position, will first cause arcuate movements along the arrows 49 until the blades reach the dotted line positions 47ª, 48ª, whereupon they will be moved forwardly along substantially rectilinear paths.

The distinction between the puller wing set 23 and the lifter wing set 20 (Fig. 9) is that the set 23 is adjustable into any radial position so that it may be made to point in the direction 50 or wherever else desired. This adjusting function is accomplished by mounting the shafts 42, 43 (Fig. 11) in the hubs 51 of relatively large gears 52, 53 respectively journaled on the upright connectors 15, 15ª of the wing framework. The large gears 52, 53 are shown in Figure 1. The leading edges 22 have end members 54 by which they are connected with the shafts. A pinion 55 (Figs. 3 and 6) meshes with the gear 52 and is carried by a shaft 57 (Fig. 3) which extends beneath the floor 5 where it carries a pinion 58 and is subject to operation by a countershaft 59.

Turning to the shaft 59 is accomplished by a crank 60 (Fig. 3), the shaft 61 of which carries a sprocket 62 to which a chain 63 is applied in common with a sprocket 64 on the shaft 59. Turning of the crank 60 causes turning of the hub 51 (Fig. 11) and a consequent radial adjustment of the leading edge 22 as suggested in Figure 9 (see dotted lines). In order to equalize the adjustment, the large gear 53 at the outer end of the puller wing set 23 (Fig. 1) has meshing with it a pinion 65, the shaft 66 of which has a pinion 67 meshing with a pinion 68 on a long shaft 69 which extends down into the fuselage 1 and has a meshing pinion connection 70 with the countershaft 59 previously described.

Figures 10, 11:
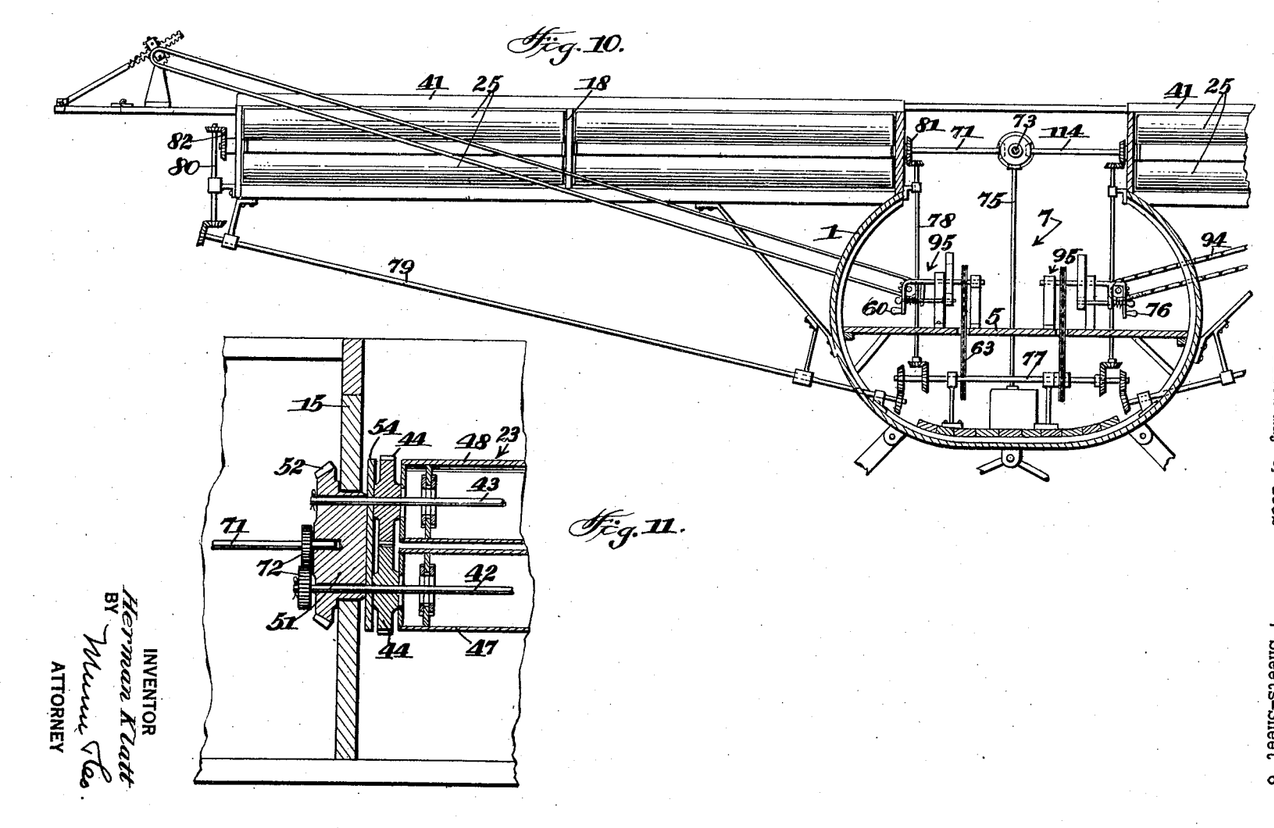
Figure 10 is a cross section taken on the line 10—10 of Figure 1, parts being shown in elevation.
Figure 11 is a detail vertical section taken on the line 11—11 of Figure 6, showing both the drive means for the blades of one of the puller wing sets, and also showing the means by which the leading casing may be adjusted into any radial position.

The adjustments of the puller wing sets 23 are entirely independent of the driving function of the shaft 42 (Fig. 11). In other words, the shaft 42 is continuously driven regardless of the radial adjustment of the leading edges 22. This result is accomplished by journaling one end of a main shaft 71 (Fig. 10 and 11) in the center of the hub 51 and then gearing the main shaft with the drive shaft 42 as at 72. It is evident that the gear on the shaft 42 bears the relationship of a planetary gear and the gear on the shaft 71 so that the former can traverse the periphery of the latter during the foregoing adjustments. The main shaft 71 is driven from a center shaft 73 (Figs. 1, 3 and 10), which shaft is a common source of applied power for all of the wing sets. The shaft is driven from either one of the engines by connections 74, 75 (Fig. 3), depending on which one of the engines is in operation.

Figure 12:
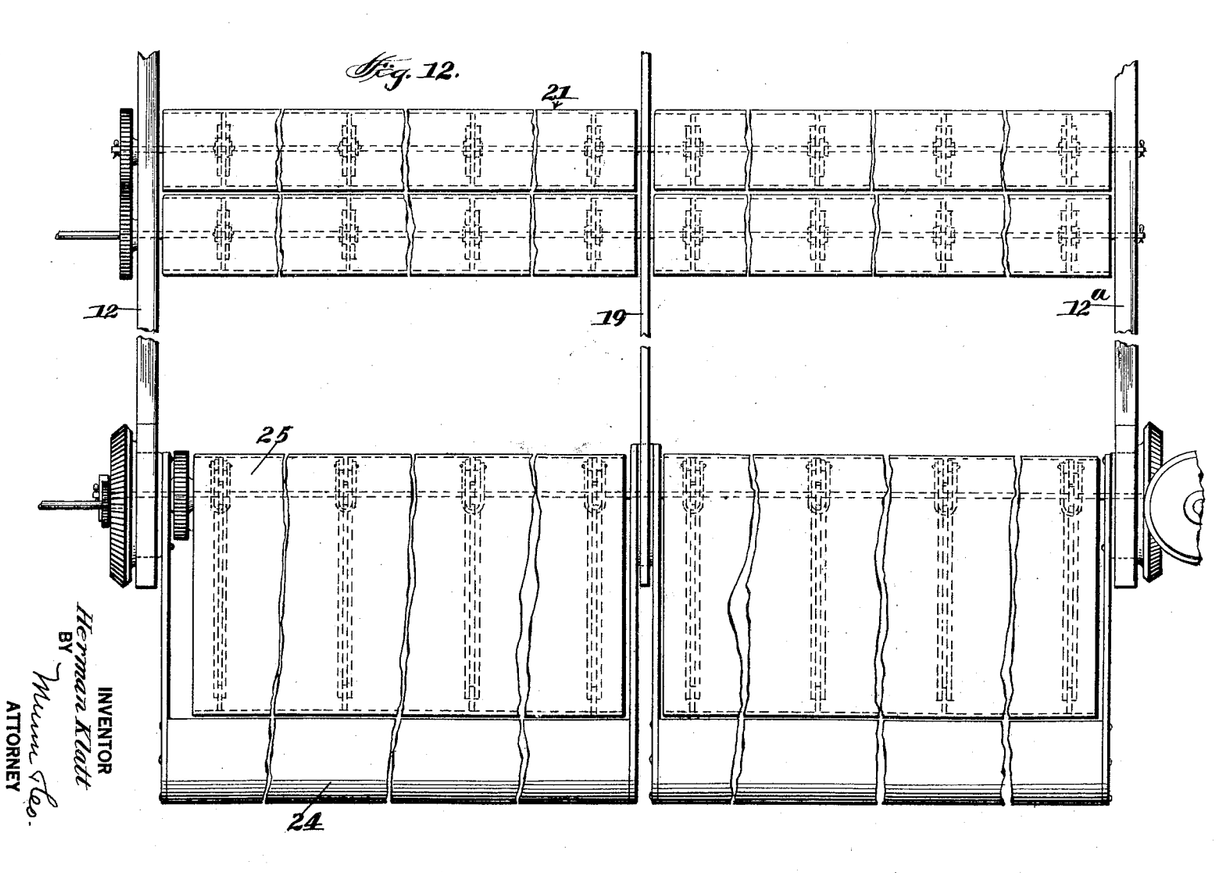
Figure 12 is a plan view of a portion of the right wing member of Figure 1, this portion including the trailing casing and the adjacent wing set, portions being broken out to enable making the showing on an enlarged scale.

The pusher wing sets 25 (Figs. 1, 7 and 12) are identical in every respect with the puller sets 23, and in order to avoid repeating the description of the latter, the same reference characters denoting corresponding parts (excepting the drive gears) in Figures 9 and 11 are applied to Figures 7 and 12 insofar as they show. The radial adjustments of the trailing edges 24 are also the same as those of the leading edges 22, and inasmuch as the adjusting mechanism of the trailing edges is disclosed in some detail in Figure 10 it may be briefly described as follows:—

A crank 76 (Fig. 10) has driving connection with a countershaft 77 which is to be regarded as the equivalent of the countershaft 59 in Figure 3. This shaft has connections 78, 79 and 80 with the remote ends of the trailing edges 24. These remote ends have relatively large gears 81, 82, matching the gears 52, 53, and by tracing the intermeshing gears both between the foregoing connections and with said large gears it will be seen that a turn of the crank 76 in either direction will produce proper turns of the large gears 81, 82 so that the trailing edges will be adjusted as required.

Ailerons are provided for the purpose of effecting the lateral stabilization of the aircraft, and the construction and mode of operation of the ailerons is as follows:—End extensions 83, 84 constitute the virtual extremities of the respective wing members 10, 11 (Fig. 1). Inasmuch as each extension and its associated parts is alike, the description of the structure at the right (Fig. 1) will suffice for both. An aileron 85 is connected with the extension 84 by hinges 86. Brackets 87 pivotally carry double rack bars 88, 89. Gears 90, 91 (Fig. 4) mesh with the opposite racks, a corresponding pair of the gears 91 being carried by a shaft 92 which is journaled in suitable supports 93 on the extension 84. The remaining gears 90 are carried by plates 90ª which are turnably mounted on the shaft 92 so that the gears 90 will accommodate themselves to the changing positions of the bars 88. The shaft 92 has a sprocket and chain connection, the chain being denoted 94, with an adjusting device 95 (Fig. 2) which is to be regarded as an illustration of the adjusting device for each aileron as well as the puller and pusher wing sets.

The crank 96 (Fig. 2) may be regarded as the equivalent of the cranks 60 and 76 of the pusher and puller wing sets. The shaft of the crank 96 is journaled on a frame 97 and carries a headed stop pin 98 which is insertible in any one of a series of holes 99 either in a plate 100 or in the end of the frame. The stop pin 98 is pulled out against the tension of the spring 101, and after the crank shaft has been turned the desired distance the end of the stop pin is let into one of the holes so as to hold the adjustment whether that be of the aileron 85 or of the other members described before.

Stabilizing fins are provided, and the manner of adjusting them is as follows: The fins 102, 103 (Fig. 1) are hinged to a support 104, and they are provided with a gear 105 (Fig. 3) with which a rack 106 meshes. This rack is held down on a guide 107 by idlers 108. Adjacent to the inner end of the rack there is a bracket 109 (Fig. 3) which has a series of perforations 110 running in the general direction of the rack. A spring pressed stop pin 111 (Fig. 1) provides both a handle for moving the rack 106 and a means for setting the adjustment of the rack in reference to the bracket 109.

The present arrangement makes a simultaneous adjustment of both fins 102, 103. This arrangement will work, bearing in mind that the ailerons 85 will be used in conjunction with the fins for stabilizing the aircraft. In practice it may be deemed desirable to make each fin independently adjustable, and in that event the only requirement would be a duplication of the rack 106 and its related parts. A rudder 112 is mounted and operated in any conventional manner.

Reference was made to the main shaft 71 as being driven by the center shaft 73. This shaft carries a plurality of gears 113 (Fig. 1), one for each of the various wing sets. In the instance of the main shaft 71 there is a duplicate main shaft 114 (Fig. 10) on the other side, and in the instance of each of the drive shafts 30 there is also a duplicate on the other side. But instead of the duplicate shaft (for instance 115, Fig. 1) driving the forward blade of the respective wing set 21 it drives the rear blade of that set. This is made necessary by the reversal of the direction of turning of the duplicate shaft 115, but in practice all of the blades of the various wing sets will work in unison as will readily be understood by tracing out the rotary motions.

The operation is briefly reviewed as follows:—It is assumed that one or the other of the two gears 3, 4 (Fig. 3) is set in operation. The purpose in providing two engines is to have one in reserve. The engine will have duplicate controls, (not shown) which in practice will be accessible to the aviator in the seat 6. It will be observed that all other controls (adjusting devices 95) are also accessible to the aviator (Fig. 1) without requiring him to leave his seat.

Assume that the aircraft is to be driven directly upward or nearly so. The puller and pusher wing sets 23, 25 (Fig. 7) will be adjusted to point upwardly. These wing sets operate in the same way at every radial adjustment, but the lifter wing sets 20, 21 (Fig. 1) are not subject to adjustment.

It has been pointed out in detail how the pairs of blades in the various wing sets perform forward strokes while remaining in substantial parallelism and then rearward strokes along arcuate paths. The action tends to create a partial vacuum adjacent to the respective leading edge, and when the arcuate strokes are performed the action is to displace or push back the air.

The creation of the partial vacuum is due to the close spacing of the blades in the starting and returning positions (Fig. 9). Here it will be seen that the blades close snugly upon reaching the return position thus excluding much air and creating a substantial degree of partial vacuum. This effect is materially aided by the leading or entering edges 22, 41. These stand in advance of the wing sets and tend to prevent air from entering the vacuum spaces between the blades. They deflect the air outwardly and away from the blades. They also protect the return stroke of the blades, minimizing the possibility of destroying the partial vacuum between the blades. For these purposes the bases of said edges are substantially as broad as the depth of the blades when together, the actual breadth of the bases being either a little more or less than the depth of the blades.

These actions occur in all of the wing sets when elevating the aircraft. When the proper altitude is reached the puller and pusher wing sets 23, 25 will be adjusted to horizontal positions as in Figure 7. The aircraft is now ready to move forwardly at the adjusted elevation. The wing sets 23, 25 will serve to move the craft forwardly, while the wing sets 20, 21 will maintain the elevation.

Should it be desired to maintain the aircraft in a substantially stationary position in midair the wing sets 23, 25 (Fig. 7) will be adjusted to point in opposite horizontal directions. The forward pull of the front wing set 23 will then be off-set by the rearward pull of the rear wing set 25. The wing sets 20, 21 will maintain the elevation as before, and the diverse operation of the puller and pusher wing sets will cause the aircraft to hover over one position.

When desiring to land, the puller and pusher wing sets will be adjusted as for hovering, and by carefully throttling the engine down the aircraft will gradually settle. It is believed that the mode of adjusting the ailerons and the stabilizing fins is understood without repeating the description.

I claim:—

1. In an aircraft having a wing member consisting of a plurality of separate elements, said elements combining to constitute the sustaining surfaces; means for moving said elements with successive rectilinear and arcuate motions to exercise a displacing action on the air, said means being so disposed as to bring said elements closely together during rectilinear motion, and means in advance of said elements during said motion serving to deflect the air.

2. In an aircraft having a wing member consisting of a plurality of separate elements arranged in pairs, and means for moving said pairs of elements first along substantially parallel paths in a rectilinear direction when together and then along arcuate paths away from each other to a return position; a wedge-shaped edge member located in advance of said elements, the base of said member being substantially equal to the depth of said elements when together.

3. In an aircraft, a wing set consisting of a pair of blades, actuating means in reference to which the blades are initially assembled in close relationship and by which means said blades are advanced together in a rectilinear direction and then separated in opposite directions, and an entering edge structure in confronting relationship to the blades and toward which they are advanced, the confronting portions of said structure and blades defining a chamber in which a partial vacuum is formed upon separation of the blades.

4. In an aircraft having a hollow blade; an endless internal rack contained by the blade, a drive pinion in mesh with the rack for causing the blade to make successive rectilinear and arcuate motions, a flange associated with the rack said flange having an external rack, an idler meshing with the external rack, and means coupling the axis of the idler and drive pinion so as to keep the idler in a substantially fixed relationship to the drive pinion and thereby maintain the internal rack in mesh with the drive pinion.

5. In an aircraft, a hollow blade, drive means and operating means for imparting motion to the drive means, and an endless drivable structure contained by and substantially agreeing in shape to the cross-sectional contour of the blade and having said drive means in connection therewith for continuously operating the blade.

6. In an aircraft, a wing member comprising a framework, a plurality of lifter wing sets mounted on the framework, operating means maintaining a permanent relationship to the framework, said operating means causing the recurrent rectilinear and arcuate motions of the lifter wing sets, puller and pusher wing sets respectively mounted on the leading and trailing edges of the framework, operating means for said puller and pusher wing sets, and means for bodily shifting each of said operating means in a circular direction so as to bodily adjust the puller and pusher wing sets into any radial directions.

7. In an aircraft, an entering edge having end members, a wing set associated with said entering edge and end members said wing set consisting of a pair of blades, actuating means for moving said blades on recurrent rectilinear and arcuate motions in respect to the entering edge, a gear having a hub to which one of the end members is attached and by which the actuating means is carried, and means to turn the gear and thereby point the entering edge and its carried wing set in any radial direction.

8. In an aircraft, a fuselage, wing members including frameworks extending from the sides of the fuselage, wing sets mounted on the frameworks, each wing set consisting of companion blades and actuating means therefor, each actuating means including a drive shaft extending into the fuselage, all of the drive shafts being in substantially confronting end relationship, a center power shaft mounted longitudinally of the fuselage, drive gearing connecting said power shaft with the ends of said drive shafts so as to operate all of the wing sets simultaneously, and means for adjusting one of the wing sets in radial directions irrespective of the remaining wing sets and while said wing set is in operation.

HERMAN KLATT.